United States Patent [19]

Webb

[11] 4,166,607
[45] Sep. 4, 1979

[54] BELLOWS SEAL VALVE

[75] Inventor: Maurice J. Webb, Mountain Lakes, N.J.

[73] Assignee: Hoke, Inc., Cresskill, N.J.

[21] Appl. No.: 732,529

[22] Filed: Oct. 14, 1976

[51] Int. Cl.² .............................................. F16K 31/00
[52] U.S. Cl. ................................. 251/335 B; 251/273
[58] Field of Search ............................. 251/335 B, 273

[56] References Cited

U.S. PATENT DOCUMENTS

| | | | |
|---|---|---|---|
| B 490,589 | 2/1976 | Massey, Jr. | 251/335 B |
| 774,985 | 11/1904 | Jones | 251/273 |
| 1,360,833 | 11/1920 | Vuilleumier | 251/273 |
| 1,983,106 | 12/1934 | Sundstrom | 251/273 |
| 2,317,422 | 4/1943 | Thomsen | 251/335 B |
| 2,439,052 | 4/1948 | McIntosh | 251/335 B |
| 2,617,621 | 11/1952 | Hobbs | 251/273 |
| 2,628,638 | 2/1953 | Herod et al. | 251/335 B |

FOREIGN PATENT DOCUMENTS

| | | | |
|---|---|---|---|
| 829844 | 12/1951 | Fed. Rep. of Germany | 251/335 B |
| 1450660 | 4/1969 | Fed. Rep. of Germany | 251/335 B |
| 568247 | 6/1923 | France | 251/335 B |
| 1212123 | 10/1959 | France | 251/273 |
| 366088 | 12/1938 | Italy | 251/335 B |
| 313718 | 6/1929 | United Kingdom | 251/335 B |
| 1417343 | 12/1975 | United Kingdom | 251/335 B |

*Primary Examiner*—William R. Cline
*Assistant Examiner*—H. Jay Spiegel
*Attorney, Agent, or Firm*—Alexander C. Wilkie, Jr.

[57] ABSTRACT

An improved bellows valve is disclosed having a relatively long bellows attached at one end to the valve control stem and at its other end to a recessed bellows mounting in the valve bonnet. The recessed attachment permits the use of a relatively long bellows with a valve bonnet of minimal size and mass and permits a wide valve opening with a relatively small valve port. Such a small valve port requires a low closing force for the stem and the use of a wide opening resists clogging. An anti-torque member connected between the valve bonnet and the valve stem prevents stem rotation to isolate the bellows from undesirble rotation during the axial stem and bellows movement.

1 Claim, 3 Drawing Figures

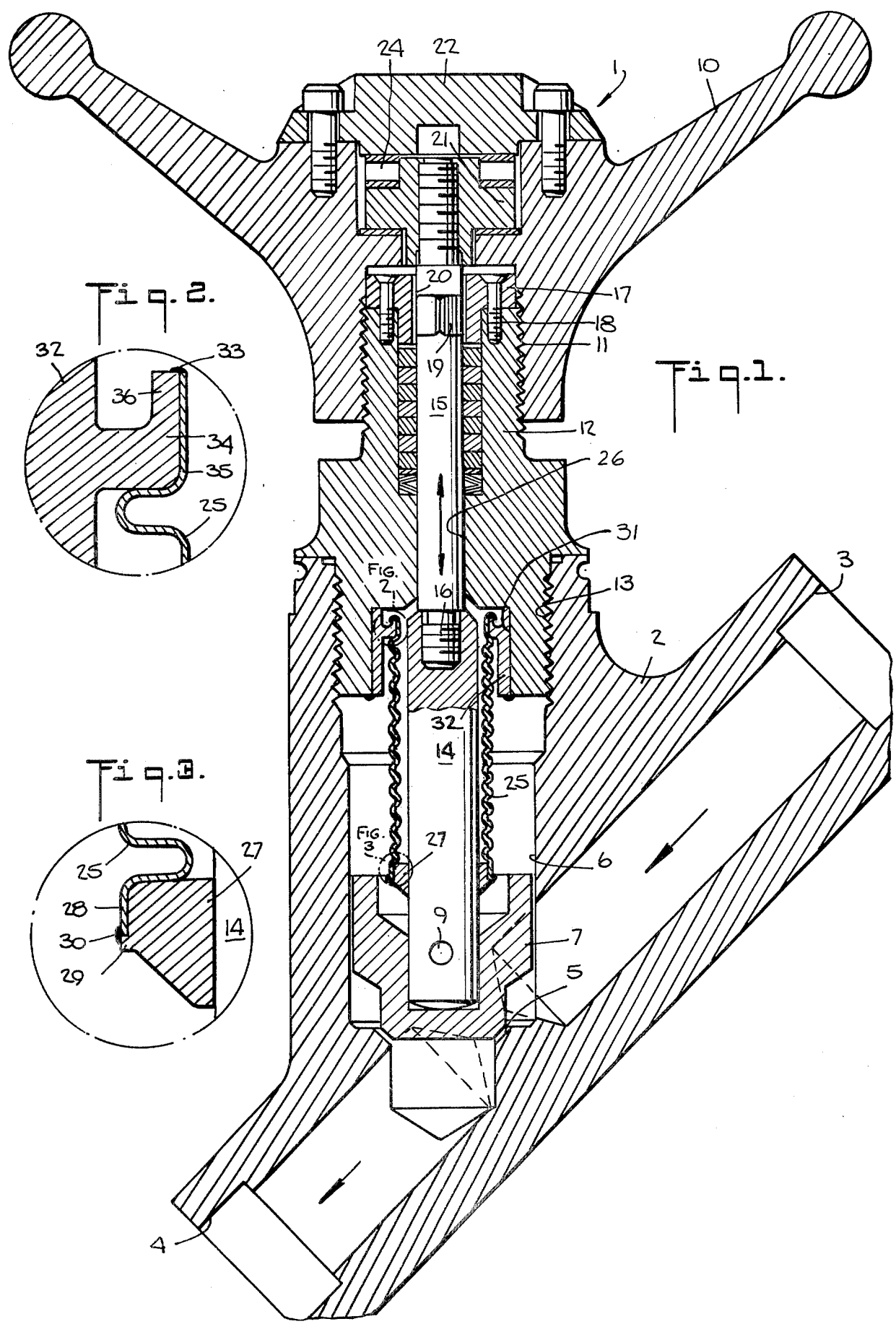

BELLOWS SEAL VALVE

BACKGROUND OF THE INVENTION

This invention relates to bellows valves and more particularly to an improved bellows valve with a recessed bellows mounting and employing a stem with long travel with relatively small ports.

There are a wide variety of valves where the sealing means between the stem and the adjacent valve body is a bellows element. The bellows is attached at one end to the valve body and at the other end to the valve stem. The flexible bellows structure permits the necessary stem movement as the bellows is extended and compressed during valve closing and opening.

It has been found desirable in valves of this type to use relatively small valve ports with a substantial valve stem movement to provide for maximum control fluid flow. Such smaller ports permit lower valve closing forces and thus smaller and more easily manipulated actuators. At the same time, the full valve opening resists clogging. A disadvantage of prior valves using long bellows has been the relatively large valve body and stem structure required to mount the elongated bellows.

The improved valve of the present invention has a recessed mounting structure for the upper end of the bellows permitting a substantial reduction in the valve body size and a corresponding shortening of the valve stem. In addition, the improved valve includes a novel and positive acting anti-torque control to prevent bellows twisting and to therefore insure a long bellows life.

Accordingly, an object of the present invention is to provide an improved bellows valve.

Another object of the present invention is to provide a more compact bellows valve having a wide stem opening action.

Another object of the present invention is to provide a bellows valve with an improved anti-torque construction.

Another object of the present invention is to provide a bellows valve with an improved bellows end mounting structure.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a vertical sectional view of a preferred embodiment of the improved bellows valve.

FIG. 2 is an enlarged detailed sectional view of the upper bellows attachment.

FIG. 3 is an enlarged detailed sectional view of the lower bellows attachment.

DESCRIPTION OF THE PREFERRED EMBODIMENT

The preferred embodiment of the improved valve 1 has a valve body 2 with spaced ports 3 and 4 communicating through a valve seat or control port 5 in a cavity 6. The flow of liquid between the spaced ports 3 and 4 is controlled by a plug 7 attached to the valve stem 8 by a suitable pin 9. The plug 7 is moved between an opened position and a closed position by axial movement of the valve stem 8 under the control of a hand wheel 10 mounted on threads 11 on the upper end of the valve bonnet 12. The valve bonnet 12 is connected by threads 13 to the valve body 2. Axial movement of the hand wheel 10 resulting from its being turned on the bonnet threads 13 provides for a corresponding axial movement of the valve stem 8. The stem 8 has a lower portion 14 which is threadedly connected to an upper stem portion 15 at 16. Movement of the stem 8 is limited to an axial movement as it is held against rotational movement by a gland 17 attached to the valve bonnet by suitable bolts 18. The stem 8 has a hexagonal or other non-round locking surface 19 slidably mounted in a complementary aperture 20, such as a hexagonal aperture, in the gland 17.

The stem 8 is rotatably attached to the hand wheel 10 by means of a retainer 21 threadedly connected to the stem 8. The retainer 21 is held between the hand wheel 10 and a hand wheel cap 22. Rotational motion between the hand wheel 10 and the retainer 21 is facilitated by a thrust washer 23 at the bottom of the retainer 21 and a roller bearing 24 positioned at the top of the retainer 21.

An elongated metallic bellows 25 forms a seal between the cavity 6 in the valve body 2 and the stem receiving aperture 26 in the valve bonnet 12. A preferred attachment between the lower end of the bellows 25 and the stem 8 is illustrated in FIG. 3. It includes a fastening ring 27 welded or otherwise attached to the stem 8 having a generally cylindrical outer surface 28 including a lower flange 29. The end portion of the bellows 25 fits snugly over the surface 28 of the ring 27 and abuts the upper edge of the flange 29. A weld 30 or other fastening is made between the flange 29 and the bellows 25.

The upper end of the bellows 25 is attached to the valve bonnet. In order to provide for a relatively long bellows and to thereby permit substantial stem motion, a recess 31 is provided in the valve bonnet 12 for receiving the upper portion of the bellows 25. A sleeve 32 is fitted tightly within the recess 31 and is welded thereto at 33 to seal the sleeve 32 and to firmly attach it to the valve bonnet 12.

A preferred means for attaching the upper end of the bellows 25 to the sleeve 32 is illustrated in FIG. 2. The attachment includes an inwardly projecting flange 34 on the sleeve 32 having a generally cylindrical outer surface 35 for snugly engaging the bellows 25. A flange-like upper portion 36 of the sleeve flange 34 is welded or otherwise fastened to the end of the bellows 25.

With an elongated bellows 25 of the form illustrated, a substantial movement of the valve stem 8 under the control of the hand wheel 10 may be obtained. This permits the stem 8 to be raised a significant distance for providing a large flow of the controlled fluid through the port 5 while using a relatively small sized port. A smaller port reduces the force required for stem movement and the wide port opening permitted by the above described structure minimizes any tendency of the valve port 5 to clog.

A back-up stem seal is provided by packing rings 37 which are held in place by gland 17.

It will be seen that an improved bellows valve has been provided which obtains significant stem movement by utilizing an elongated bellows having a recessed bellows attachment. This bellows permits significant stem movement to obtain the related advantages of a small valve port and a wide port opening for preventing clogging of the controlled fluid flow at the valve port. The improved hand wheel or actuator mounting also provides for a relatively easy axial stem motion without stem rotation to insure a long bellows life.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a bellows valve having:
   a valve body with a fluid cavity including a control port coupling an inlet port to an outlet port;
   a valve bonnet attached to said valve body at one end and having a control member mounting means at its opposite end;
   a stem receiving aperture in said bonnet;
   a valve stem mounted in said stem receiving aperture for axial movement towards and away from the control port;
   a gland coupled to said bonnet having a non-round aperture thereby engaging a complimentary portion of said stem;
   a port closing means positioned on one end of said stem and within said cavity;
   a control member attached to the opposite end of said stem and threadably coupled to said mounting means;
   the improvement comprising said stem receiving aperture having an enlarged portion at said one end of said bonnet forming a bellows receiving recess;
   an elongated metallic bellows;
   a ring attached at said one end of said stem;
   one end of said bellows extending into said recess;
   a hollow sleeve positioned within said recess and attached to the side walls of said recess;
   a radially inward extending flange on said sleeve;
   said one end of said bellows terminating in a generally circular cylindrical portion;
   said flange having a complimentary circular cylindrical portion welded to said cylindrical portion of said bellows; and
   the opposite end of said bellows welded to said ring.

* * * * *